(12) United States Patent
Dingel (10) Patent No.: US 6,597,841 B1
(45) Date of Patent: Jul. 22, 2003

(54) MULTI-OUTPUT ARRAYED WAVEGUIDE GRATING DEMULTIPLEXER

(75) Inventor: Benjamin B. Dingel, Painted Post, NY (US)

(73) Assignee: Corning Incorporated, Corning, NY (US)

(*) Notice: Subject to any disclaimer, the term of this patent is extended or adjusted under 35 U.S.C. 154(b) by 11 days.

(21) Appl. No.: 10/047,304

(22) Filed: Jan. 14, 2002

(51) Int. Cl.$^7$ ................................................ G02B 6/34
(52) U.S. Cl. ............................. 385/37; 385/24; 385/46
(58) Field of Search ........................... 385/37, 39, 24, 385/14, 15, 16, 46, 123

(56) References Cited

U.S. PATENT DOCUMENTS

| | | | |
|---|---|---|---|
| 5,002,350 A | 3/1991 | Dragone | 385/37 |
| 5,412,744 A | 5/1995 | Dragone | 385/24 |
| 5,488,500 A | 1/1996 | Glance | 359/127 |
| 5,600,742 A | 2/1997 | Zirngibl | 385/37 |
| 5,617,234 A | 4/1997 | Koga et al. | 359/131 |
| 6,055,078 A | 4/2000 | Chen et al. | 359/130 |
| 6,266,464 B1 | 7/2001 | Day et al. | 385/37 |
| 6,271,949 B1 | 8/2001 | Suemura et al. | |
| 6,272,270 B1 | 8/2001 | Okayama | |
| 6,501,896 B2 * | 12/2002 | Nara et al. | 385/129 |

FOREIGN PATENT DOCUMENTS

| | | |
|---|---|---|
| EP | 0 964 535 | 12/1999 |
| EP | 1 076 248 A1 | 2/2001 |
| JP | 10-303815 | 11/1998 |

OTHER PUBLICATIONS

H. Li et al., "Full Coverage Multichannel Wavelength Monitoring Circuit Using CentreOffset Phased–Array Waveguide Grating", *Electronics Letters*, Oct. 29, 1998, vol. 34, No. 22, pp. 2149–2151.

K. Okamoto et al., "Fabrication of Multiwavelength Simultaneous Monitoring Device Using Arrayed–Waveguide Grating", *Electronics Letters*, Mar. 14, 1996, vol. 32, No. 6, pp. 569–570.

M. Teshima et al., "Multiwavelength Simultaneous Monitoring Circuit Employing Wavelength Crossover Properties of Arrayed–Waveguide Grating", *Electronics Letters*, Aug. 31, 1995, vol. 31, No. 18, pp. 1595–1597.

*Critical Reviews, vol. CR71: Wavelength Division Multiplexing*, Chen, R.T. and Lome, L.S. eds., pp. 98–100.

S. Zhong et al., "Integrated Real Time Multi–Channel Wavelength Monitoring Circuit Using Phased–Array Waveguide Grating", Optical Fiber Conference 1999 Technical Digest, Paper ThB5.

* cited by examiner

*Primary Examiner*—Phan T. H. Palmer
(74) *Attorney, Agent, or Firm*—Foley & Lardner (57) ABSTRACT

An optical device for receiving an optical signal of one or more wavelengths comprises an n-way optical coupler, where n is any integer $\geq 2$, to split the optical signal by an intensity ratio into n branch signals. The device also comprises an arrayed waveguide grating, which includes a first optical slab having n input ports, where each branch signal is coupled to a different input port and a waveguide array structure including a plurality of waveguides. The waveguides have incrementally different path lengths. The device further comprises a second optical slab coupled to each of the plurality of waveguides of the waveguide array structure. In the second optical slab, the n branch signals are each demultiplexed. With this configuration, the demultiplexed signals of each branch signal do not substantially overlap with the demultiplexed signals of another branch signal at an output face of the second optical slab.

20 Claims, 12 Drawing Sheets

MULTI-OUTPUT ARRAYED WAVEGUIDE GRATING DEMULTIPLEXER

BACKGROUND OF THE INVENTION

1. Field of the Invention

This invention generally relates to the field of optical devices, and more particularly to devices that combine demultiplexing with splitting, switching, or monitoring functionality.

2. Description of the Related Art

In the rapidly evolving field of Dense Wavelength Division Multiplexing (DWDM), there is an increasing need to monitor, manage and protect optical wavelength signals as they propagate throughout different network elements. This monitoring/management ensures the reliability of the final signal and of the network system as a whole. Conventionally, this monitoring/management is achieved through the use of two separate devices: a demultiplexer and a tap monitor array. At present, these two elements are taken as separate devices because their fundamental physical mechanisms are different. Traditionally, there have been a number of ways to implement these two devices.

The most widely used demultiplexing device is the arrayed waveguide grating (AWG). AWGs, in particular, are suitable for handling a large number of wavelengths (or channels). Conventional AWGs are planar devices having a plurality of substantially parallel waveguides, each differing in length from its nearest neighbors, coupling two opposing star couplers, such as shown in, e.g., U.S. Pat. No. 5,002,350 and U.S. Pat. No. 6,266,464.

A tap monitor array is conventionally provided in one of two known devices. In a first conventional device, each output of an AWG is coupled to a 1×2 coupler, which pull tap signals off each of the demultiplexed output signals. In an alternative conventional device a single 1×2 directional coupler pulls a tap signal from the primary signal. The primary signal is demultiplexed by a first AWG, while the tap signal is demultiplexed by an additional AWG, such as shown in U.S. Pat. No. 5,617,234. In a similar conventional device, the tap signal is demultiplexed instead by a single channel tunable filter. This tunable filter serially selects individual wavelengths from the tap signal in the time domain.

Due to the conventional requirement that the functions of a demultiplexer and a tap array be performed by two separate devices, conventional devices have the problem of inefficient use of optical power and of space. In addition, due to fabrication differences between multiple AWGs, or among a plurality of directional couplers, the relative intensities of the demultiplexed tap signals may be different than the demultiplexed primary signals.

There remains a need for an optical device that efficiently provides multiple sets of demultiplexed signals from a single multiplexed input signal.

SUMMARY OF THE INVENTION

According to one aspect of the present invention, an optical device for receiving a primary optical signal having one or more wavelengths is provided. The optical device includes an n-way optical coupler, where n is an integer $\geq 2$, the n-way optical coupler having one input and n outputs, the n-way optical coupler directing the optical signal into at least one of the outputs of the n-way optical coupler; and an arrayed waveguide grating. The arrayed waveguide grating includes a first optical slab having an exterior face and an interior face, the exterior face having n ports, each of the n ports being coupled to an output of the n-way optical coupler, each port receiving the optical signal emerging from the corresponding output of the n-way optical coupler. The arrayed waveguide grating also includes a waveguide array structure including a plurality of waveguides, each of the waveguides having a first end coupled to the interior face of the first optical slab, each of the waveguides having a second end. The arrayed waveguide grating further includes a second optical slab having an interior face and an exterior face, the interior face being coupled to the second end of each of the plurality of waveguides of the waveguide array structure, the exterior face having a plurality of ports. In this optical device, the optical signal emerging from each of the outputs of the n-way coupler is demultiplexed to a corresponding set of demultiplexed main diffraction order signals in the second optical slab. The n ports of the first optical slab that are coupled to the n-way optical coupler are spaced in relation to one another such that for each of the outputs of the n-way coupler, the demultiplexed main diffraction order signals corresponding to an optical signal emerging from that output of the n-way coupler do not substantially overlap with the demultiplexed main diffraction order signals corresponding to an optical signal emerging from any other of the outputs of the n-way optical coupler at the exterior face of the second optical slab. The n ports of the first optical slab that are coupled to the n-way optical coupler are also spaced in relation to one another such that demultiplexed signals of one wavelength do not substantially overlap with demultiplexed signals of another wavelength at the exterior face of the second optical slab.

In another aspect of the present invention, an optical device for receiving a primary optical signal having one or more wavelengths is provided. The optical device includes an n-way optical coupler, where n is an integer $\geq 2$, the n-way optical coupler having one input and n outputs, the n-way optical coupler directing the optical signal into at least one of the outputs of the optical coupler, one of the outputs of the n-way optical coupler being coupled to a port of the first optical slab, another of the outputs of the n-way optical coupler being coupled to a port of the second optical slab, and an arrayed waveguide grating. The arrayed waveguide grating includes a first optical slab having an exterior face and an interior face, the exterior face having a plurality of ports; a waveguide array structure including a plurality of waveguides, each of the waveguides having a first end coupled to the interior face of the first optical slab, each of the waveguides having an second end; and a second optical slab having an interior face and an exterior face, the interior face being coupled to the second end of each of the plurality of waveguides of the waveguide array structure, the exterior face having a plurality of ports. In this device, an optical signal coupled into a port of the first optical slab is demultiplexed to a set of demultiplexed main diffraction order signals in the second optical slab, and an optical signal coupled into a port of the second optical slab is demultiplexed to a set of demultiplexed main diffraction order signals in the first optical slab.

The present invention results in a number of advantages over prior art devices and methods. For example, the devices of the present invention may be used to construct compact and power efficient devices providing both demultiplexing and switching, splitting or monitoring functionality.

Other advantages and innovations of the present invention will become apparent to those skilled in the art from the detailed description which follows and the accompanying figures. Furthermore, the preceding summary and the following description are illustrative only and do not restrict the present invention as claimed.

BRIEF DESCRIPTION OF THE DRAWINGS

The accompanying drawings, which are incorporated herein and form part of the specification, illustrate the present invention and, together with the description, further serve to explain the principles of the invention and to enable one skilled in the art to make and use the invention.

DETAILED DESCRIPTION OF THE PREFERRED EMBODIMENTS

Generally, the present invention relates to an optical device which combines demultiplexing with splitting, switching, or monitoring functionality.

Figure 1:
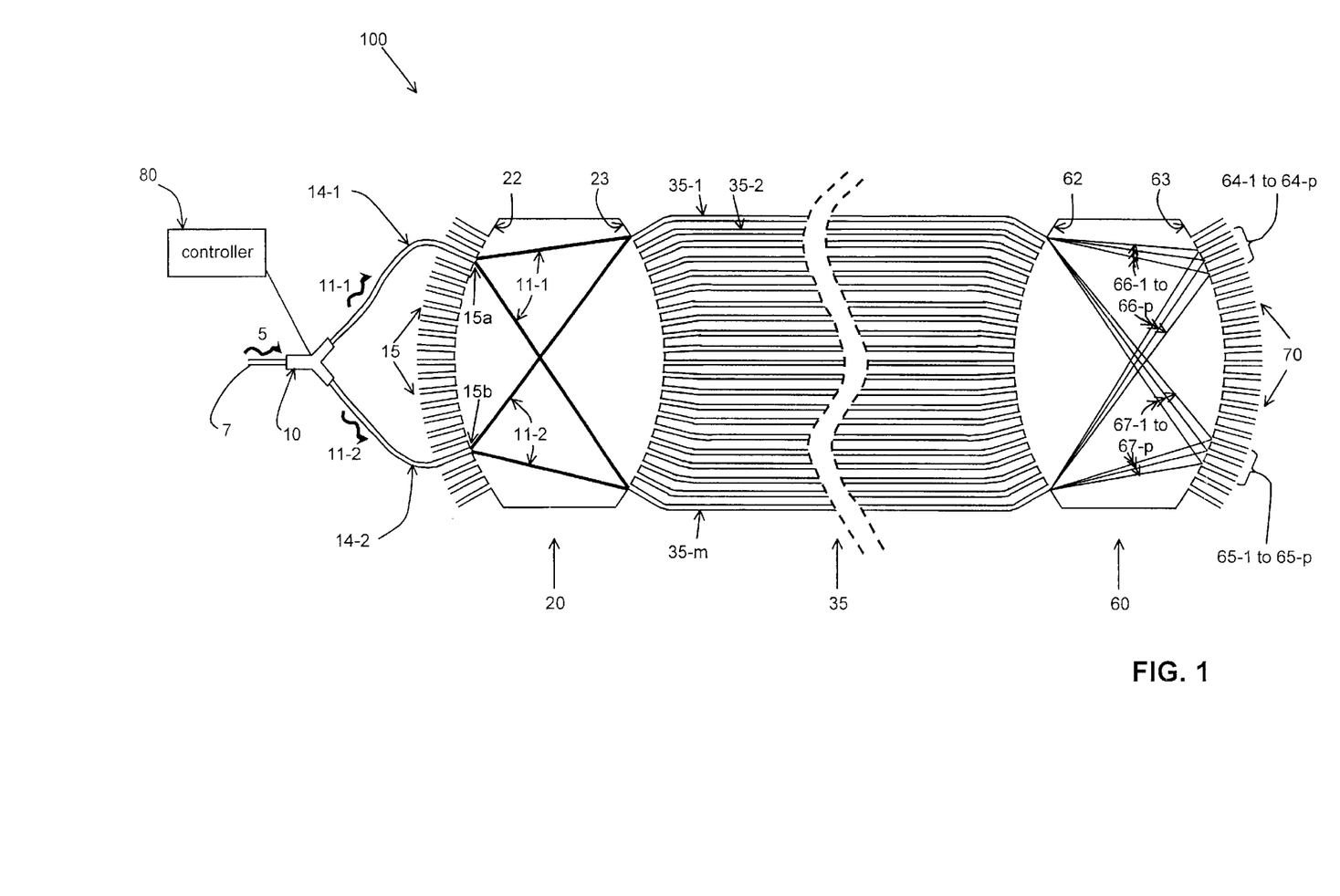
FIG. 1 is a schematic diagram of an n-way optical coupler coupled to an arrayed waveguide grating according to an embodiment of the present invention.

FIG. 1 shows an optical device 100 according to a first embodiment of the present invention. The device 100 can be fabricated as a planar waveguide from conventional materials such as silica, glass, silicon, III–V semiconductors, or polymeric materials, and can be integrated on a substrate (not shown), as would be apparent to one of ordinary skill in the art given the present description.

An n-way optical coupler 10 receives an input primary optical signal 5 from waveguide 7. The primary optical signal 5 can comprise one or more wavelengths, such as a multiplexed (WDM or DWDM) optical signal having wavelengths $\lambda_1$–$\lambda_p$. Preferably, n-way optical coupler 10 splits the primary signal 5 into n branch signals 11-1 to 11-n. N-way optical coupler 10 can be any one of a number of optical devices which split a primary optical signal into separate branch signals by a selected intensity ratio so that each branch signal has a selected intensity. In the example depicted in FIG. 1, the primary signal 5 is split into two branch signals 11-1 and 11-2, both having wavelengths $\lambda_1$–$\lambda_p$. The coupler 10 can split signal 5 into branch signals 11-1 and 11-2 with a desired intensity ratio (e.g. 50:50, 90:10, 95:5) depending on the coupler design. In the example depicted in FIG. 2, n-way optical coupler 10 is shown for simplicity as a 2-way optical coupler. However, the optical device of the present invention is not limited to a 2-way optical coupler, and the system shown in FIG. 1 can be modified to include an n-way optical coupler 10 having n greater than two to provide more than two branching signals.

Figure 2:
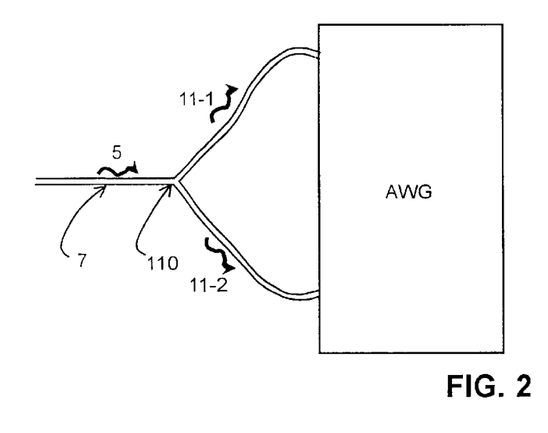
FIG. 2 is a schematic of an alternative arrangement for the n-way optical coupler using a Y waveguide optical coupler according to an alternative embodiment of the present invention.
Figure 3:
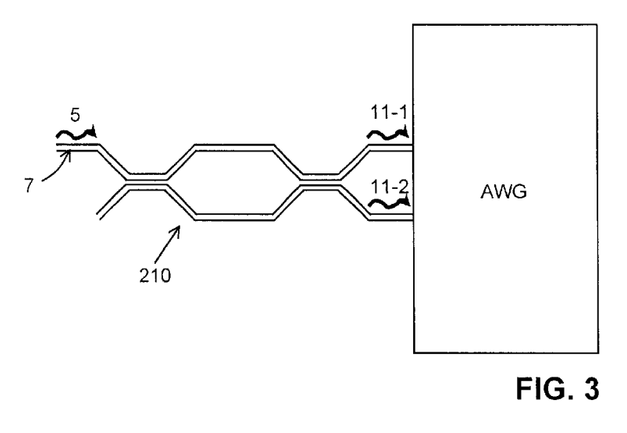
FIG. 3 is a schematic of another alternative arrangement for the n-way optical coupler using a Mach-Zehnder interferometer according to an alternative embodiment of the present invention.
Figure 4:
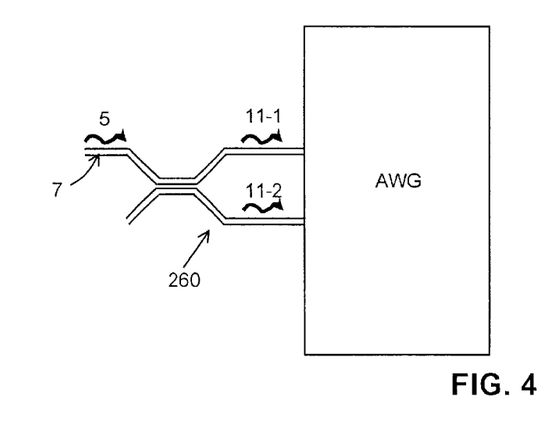
FIG. 4 is a schematic of another alternative arrangement for the n-way optical coupler using a directional coupler according to an alternative embodiment of the present invention.
Figures 5, 6:
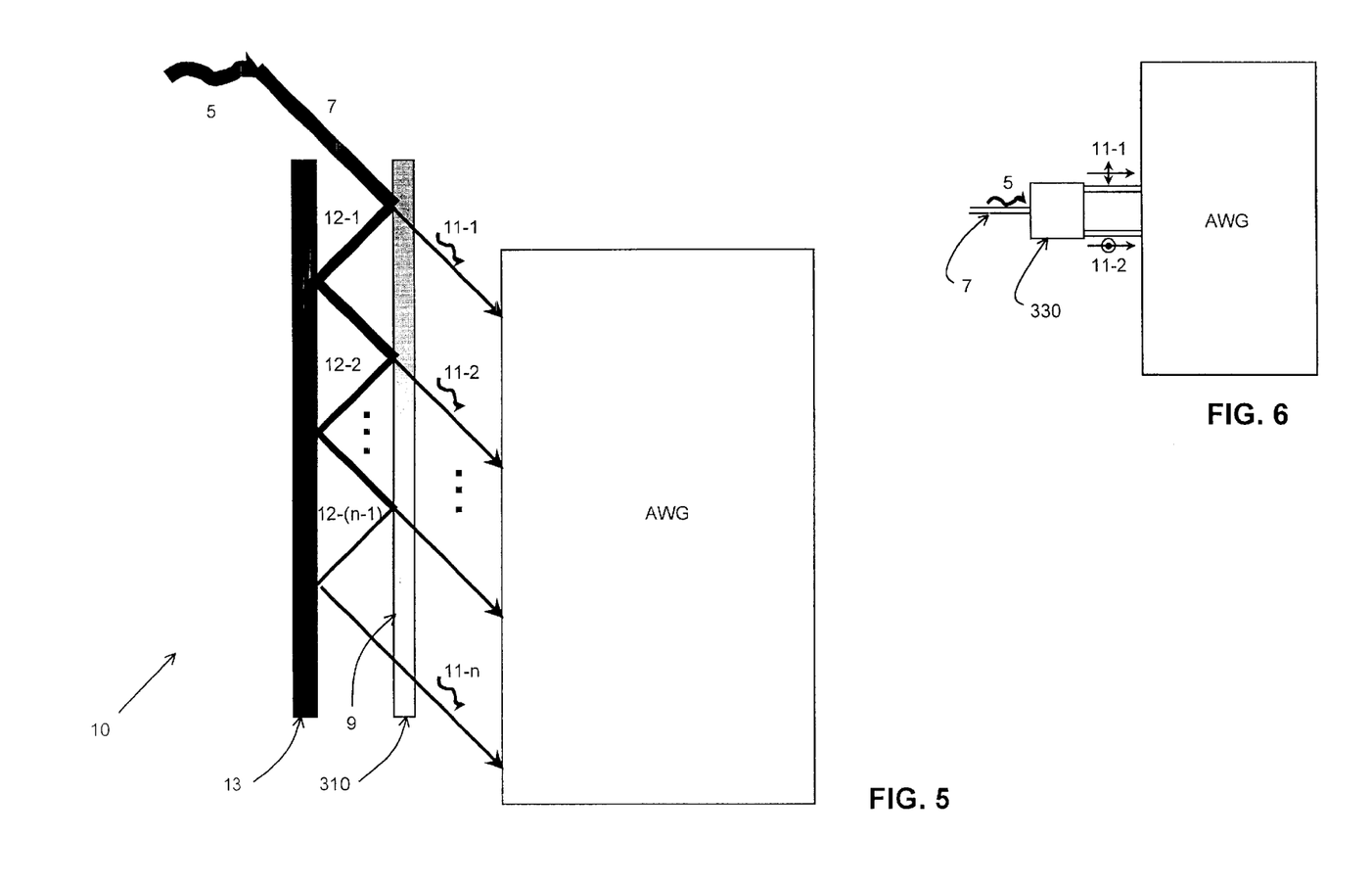
FIG. 5 is a schematic of another alternative arrangement for the n-way optical coupler using a semi-transparent mirror according to an alternative embodiment of the present invention.
FIG. 6 is a schematic of another alternative arrangement for the n-way optical coupler using a polarization beam splitter according to an alternative embodiment of the present invention.

FIGS. 2–6 show examples of optical devices that can be used as n-way optical coupler 10. FIG. 2 shows a Y waveguide coupler 110. Primary signal 5 enters the Y waveguide coupler 110 through waveguide 7. The Y waveguide coupler splits primary signal 5 into branch signals with a 50:50, 90:10, or other desired intensity ratio. In an alternative embodiment, shown in FIG. 3, the n-way optical coupler may be a Mach Zehnder interferometer splitter 210, which splits the input signal 5 into two branch signals 11-1 and 11-2 according to known beam interference principles. Alternatively, as shown in FIG. 4, the n-way optical coupler may be a directional coupler 260. FIG. 5 shows another alternative embodiment, in which a semi-transparent mirror 310 is used as n-way optical coupler 10, whereby signal 5 enters the semi-transparent mirror 310 via waveguide 7 and encounters partially reflecting surface 9. As a result of encountering partially reflecting surface 9, a portion of signal 5 is transmitted as branch signal 11-1, and a portion is reflected as beam 12-1. Beam 12-1 is then reflected by totally reflecting surface 13 and is subsequently split by surface 9 into transmitted branch signal 11-2 and reflected beam 12-2. This process of transmission and reflection continues creating a plurality of branch signals 11-1 to 11-n. As shown in FIG. 6, a polarization beam splitter 330 can be utilized to split the optical signal into different branches on the basis of polarization. As the skilled artisan will appreciate, multiple 2-way optical couplers, such as Mach Zehnder interferometers, directional couplers, and Y waveguide couplers, can be cascaded to yield an n-way optical coupler. In addition, as would be apparent to one of ordinary skill in the art given the present description, other alternative devices can be employed as an n-way optical coupler 10.

The n-way optical coupler may be controllable to alter the ratio of the intensities of the branch signals. Such control may be achieved using, for example, a thermo-optic or an electro-optic effect, as would be apparent to the skilled artisan. Returning to FIG. 1, a controller 80 can be coupled to n-way optical coupler 10 in order to control the intensity ratio of the resultant branch signals and/or the number of resultant branch signals 11-1 to 11-n. Because system requirements can be subject to change, the controller 80 can be designed to further include sufficient programmable memory (e.g., EPROMs and the like) to receive and implement additional operating software and/or commands from a system controller or network management system (not shown). For example, in a first state, the controller can set the intensity ratio (between the branch signals) to be a first intensity ratio, or it can set the number of resultant branch signals to be a first number (e.g., 2, 3, etc.). In a second state, the controller can set the intensity ratio to be a different intensity ratio or can set the number of resultant branch signals to be a different number. The n-way optical coupler can alternatively be operative to switch substantially all of the intensity of the primary optical signal between the n outputs of the n-way optical coupler. Such switches are familiar to the skilled artisan, and may be based on MEMS, thermo-optic, electro-optic, piezoelectric and other devices.

In the embodiment shown in FIG. 1, the outputs of the 2-way optical coupler 10 are coupled to the ports 15a and 15b of the first optical slab 20 by waveguides 14-1 and 14-2. As is understood in the art and used herein, an optical slab comprises an area in which light is guided in the direction perpendicular to the plane of the slab, but is not guided within the plane of the slab. In this exemplary embodiment, the first optical slab 20 is configured as a star coupler, with the exterior face 22 of the optical slab having a plurality of ports 15. According to this embodiment, the branch signals enter the optical slab 20 via ports 15a and 15b. Ports 15a and 15b have at least one other port 15 between them. Hence, ports 15a and 15b are said to be non-adjacent. As will be described more fully below, the spacing of the ports of the first optical slab has an impact on the function of the device.

The first optical slab has an interior face 23, to which the first ends of the waveguides 35-1 to 35-m of a waveguide array structure 35 are coupled. In the embodiment of FIG. 1, each of the waveguides of the waveguide array structure has a different optical path length from the other waveguides. For example, waveguide 35-1 can have an optical path length of l, waveguide 35-2 can have an optical path length of l+Δd, and waveguide 35-m can have an optical path length of l+(m−1)Δd. The waveguide array 35 can include, for example, 128 or 256 waveguides, as is known in conventional AWGs. The second end of each waveguide 35-1 to 35-m of the waveguide array structure is coupled to the interior face 62 of a second optical slab 60. The second optical slab also includes an exterior face 63, and ports 70 spaced along the exterior face. In the embodiment of FIG. 1, the second optical slab is likewise configured as a star coupler.

Figure 7:
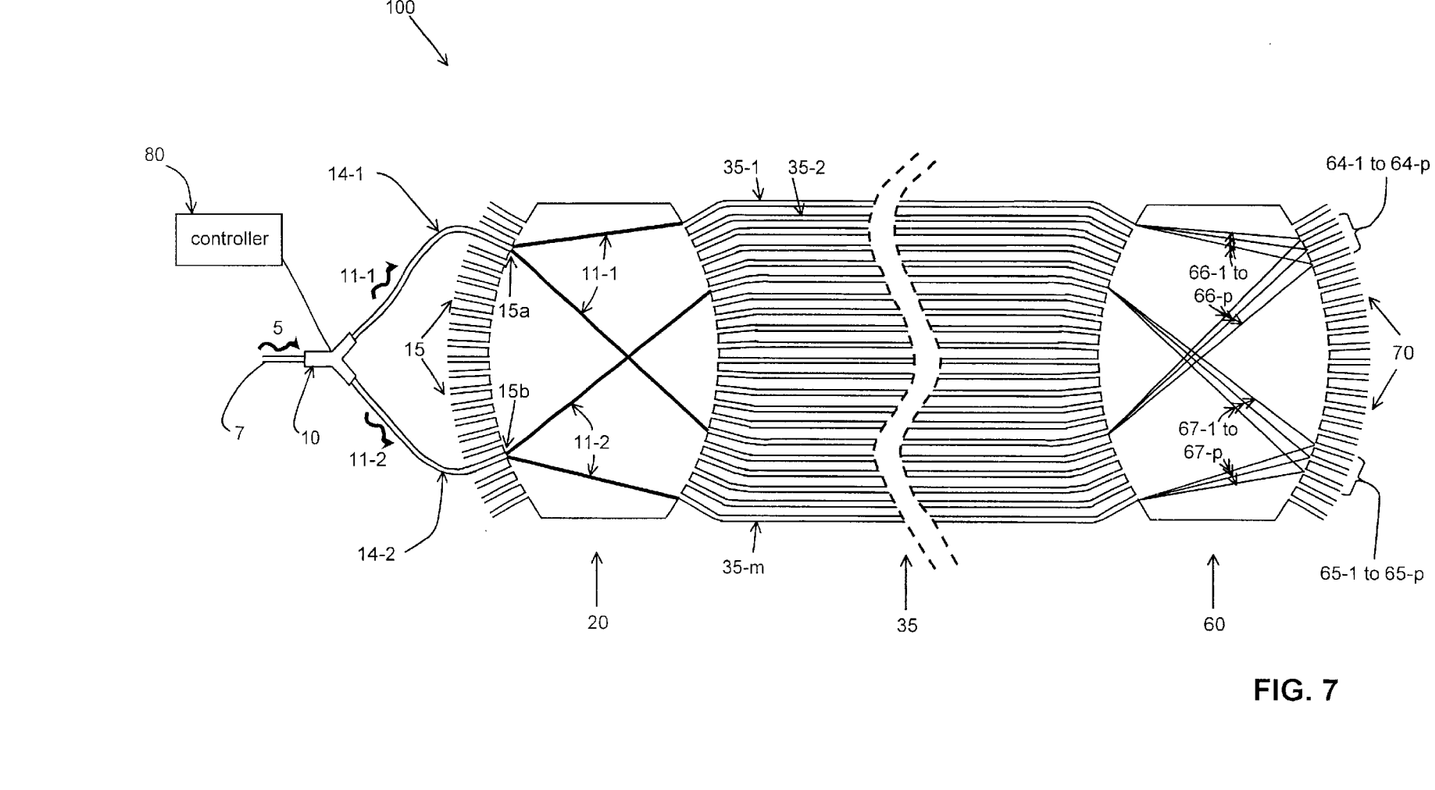
FIG. 7 is a schematic diagram of a device in which the branch signals are coupled to partially overlapping sets of waveguides.
Figure 8:
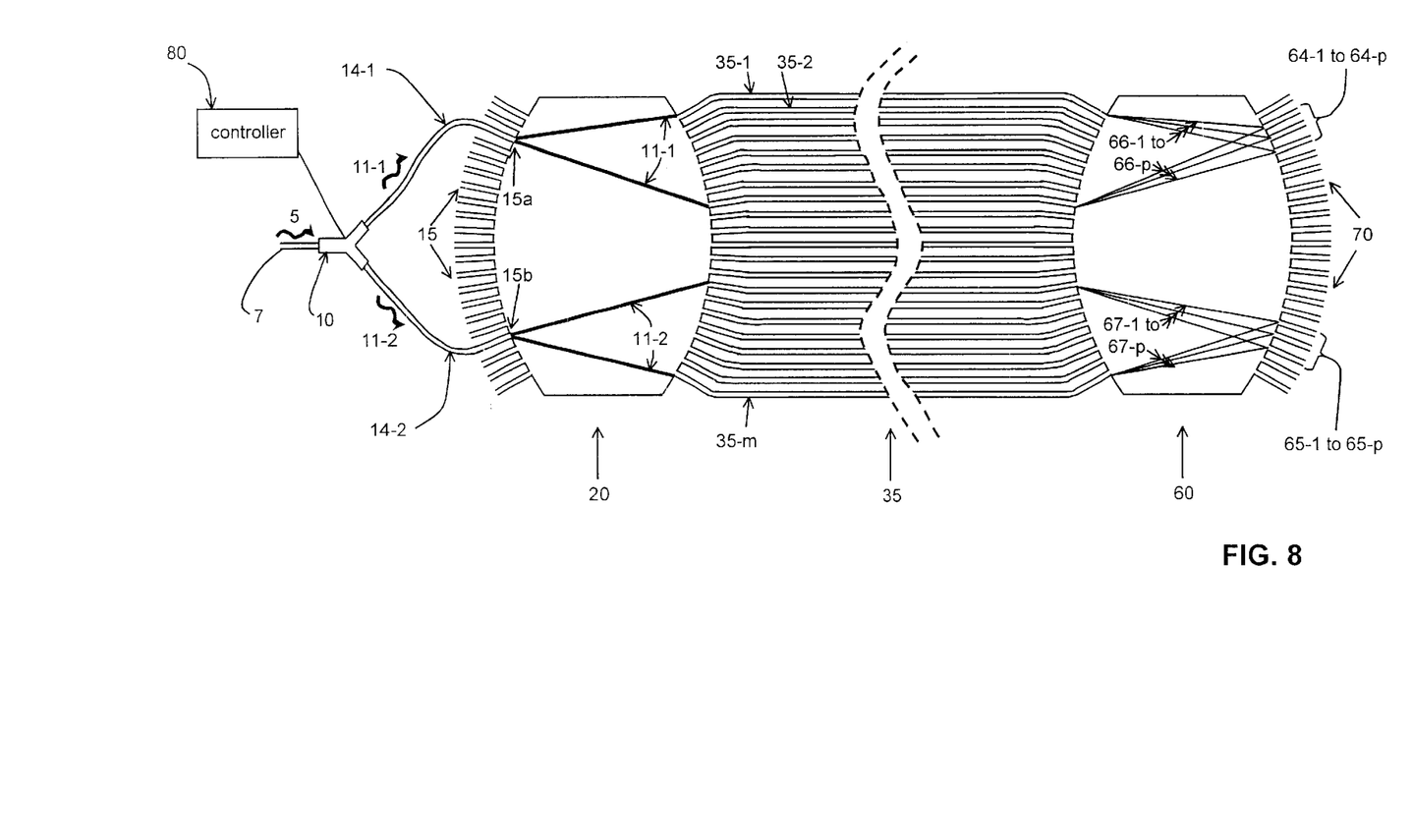
FIG. 8 is a schematic diagram of a device in which the branch signals are coupled to non-overlapping sets of waveguides.

In the embodiment shown in FIG. 1, the two branch signals 11-1 and 11-2 (each having wavelengths $\lambda_1$–$\lambda_p$) emerging from the 2-way optical coupler 10 are coupled to the exterior face of a first optical slab 20 of the AWG via non-adjacent ports 15a and 15b, and allowed to expand or fan out in the plane of the slab. The spatially expanded branch signals 11-1 and 11-2 are each coupled to a plurality of the waveguides of the waveguide array structure. Each branch signal may be coupled to substantially all of the waveguides 35-1 to 35-m of the waveguide array structure 35, as shown in FIG. 1. Alternatively, each branch signal may be coupled to less than all of the waveguides of the waveguide array structure. For example, as shown in FIG. 7, the branch signals may be coupled to overlapping subsets of the waveguides of the waveguide array. In another embodiment, as shown in FIG. 8, the branch signals may be coupled to non-overlapping subsets of the waveguides of the waveguide array.

After passing through waveguide array structure 35, the signals from the waveguides of the waveguide array structure are coupled to the second optical slab 60. As in conventional AWG devices, the phase shifted signals emerging from the outputs of the waveguides 35-1 to 35-m of the waveguide array structure interact with one another in second optical slab 60. The difference in path length of the waveguides of the waveguide array as well as in the distances traveled by the beams in the first and second optical slabs impart a different phase delay on the signals propagating in each waveguide of the waveguide array structure. Thus, the ends of the waveguides of the waveguide array structure act as a diffraction grating, focusing different wavelengths on different parts of the exterior face of the second optical slab, as is consistent with known AWG techniques. As a result of this interaction, a set of demultiplexed signals resulting from the main diffraction order diffraction of each branch signal is coupled to the exterior face 63 of the second optical slab. As used herein, the main diffraction order is the diffraction order having the largest intensity of diffracted signal. For example, as shown in FIG. 1, a set of main diffraction order demultiplexed signals 66-1 to 66-p (having wavelengths $\lambda_1$–$\lambda_p$ respectively) corresponding to branch signal 11-1, as well as a set of demultiplexed signals 67-1 to 67-p (also having wavelengths $\lambda_1$–$\lambda_p$) corresponding to branch signal 11-2 are coupled to the exterior face of the second optical slab. These sets of demultiplexed signals are coupled to ports 64-1 to 64-p and 65-1 to 65-p of the second optical slab 60. The ratios of intensities of the sets of demultiplexed signals is determined in part by the intensity ratio of the n-way optical coupler 10. In the devices of the present invention, the n ports of the first optical slab that are coupled to the outputs of the n-way optical coupler are spaced so that the demultiplexed main diffraction order signals corresponding to different outputs of the n-way coupler do not substantially overlap with one another. As used herein, signals substantially overlap if, at a specified point, the intensity of light is less than about 90% due to a single signal.

Figure 9:
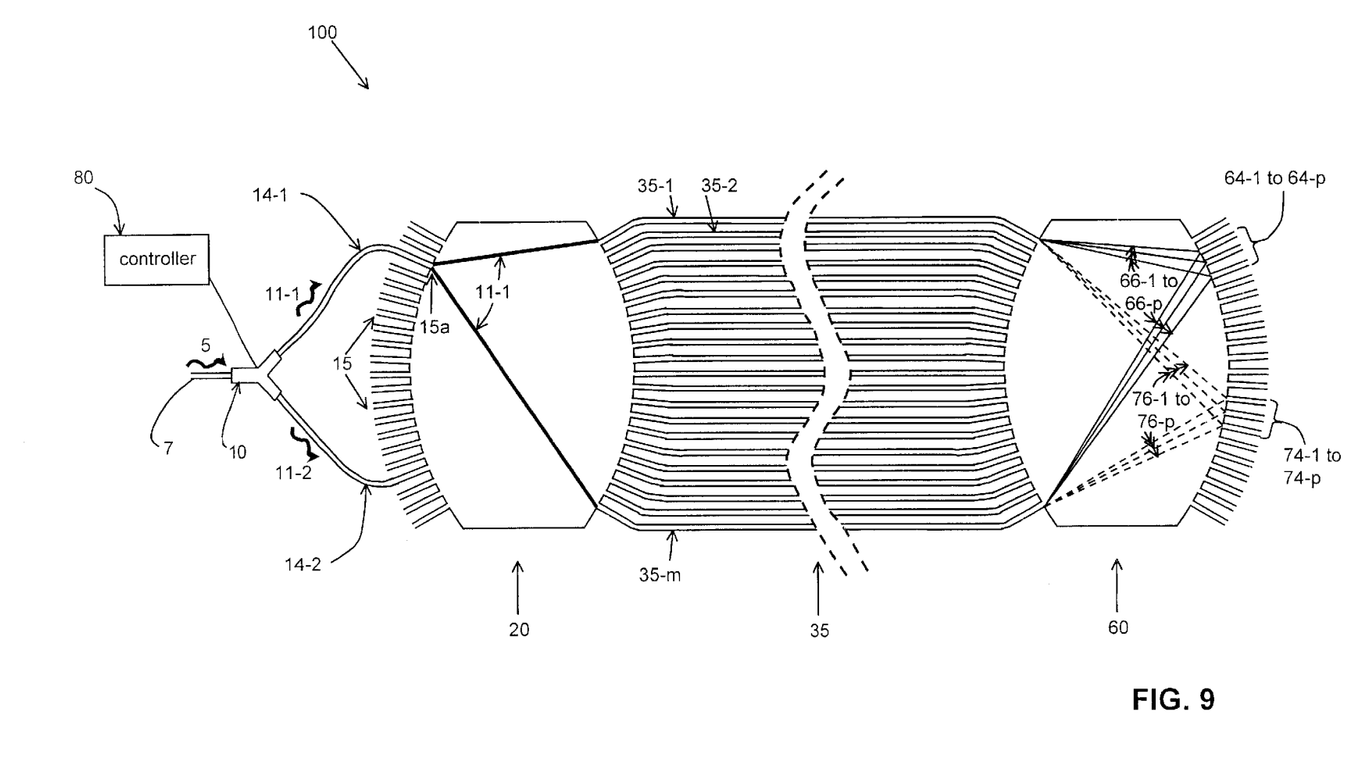
FIGS. 9 and 10 are schematic diagrams demonstrating diffraction of branch signals into multiple diffraction orders.
Figure 10:
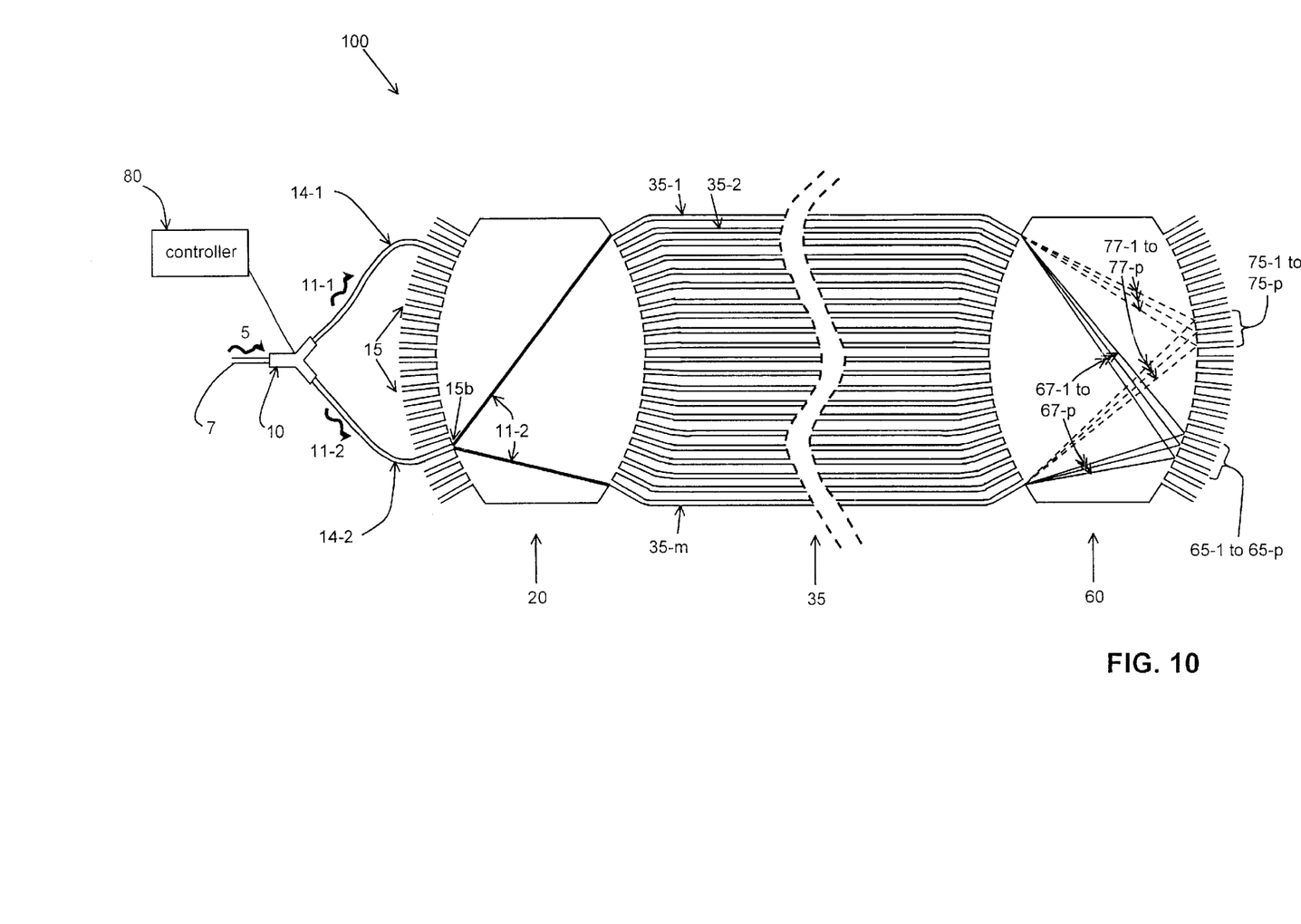

As the skilled artisan will appreciate, each branch signal may be diffracted into more than one diffraction order. For example, as shown in FIG. 9, branch signal 11-1 may have most of its intensity diffracted into the main diffraction order, and a small amount of its intensity diffracted into an adjacent diffraction order. Thus, the demultiplexed main diffraction order signals 66-1 to 66-p arising from branch signal 11-1 are coupled to ports 64-1 to 64-p of the second optical slab 60, while the corresponding demultiplexed adjacent diffraction order signals are coupled to ports 74-1 to 74-p of the second optical slab. Likewise, as shown in FIG. 10, branch signal 11-2 may have most of its intensity in a main diffraction order, with a small amount of intensity in an adjacent diffraction order. Thus, demultiplexed main diffraction order signals 67-1 to 67-p arising from branch signal 11-2 are coupled to ports 65-1 to 65-p of the second optical slab, while the corresponding demultiplexed adjacent diffraction order signals are coupled to ports 75-1 to 75-p of the second optical slab.

Figure 11:
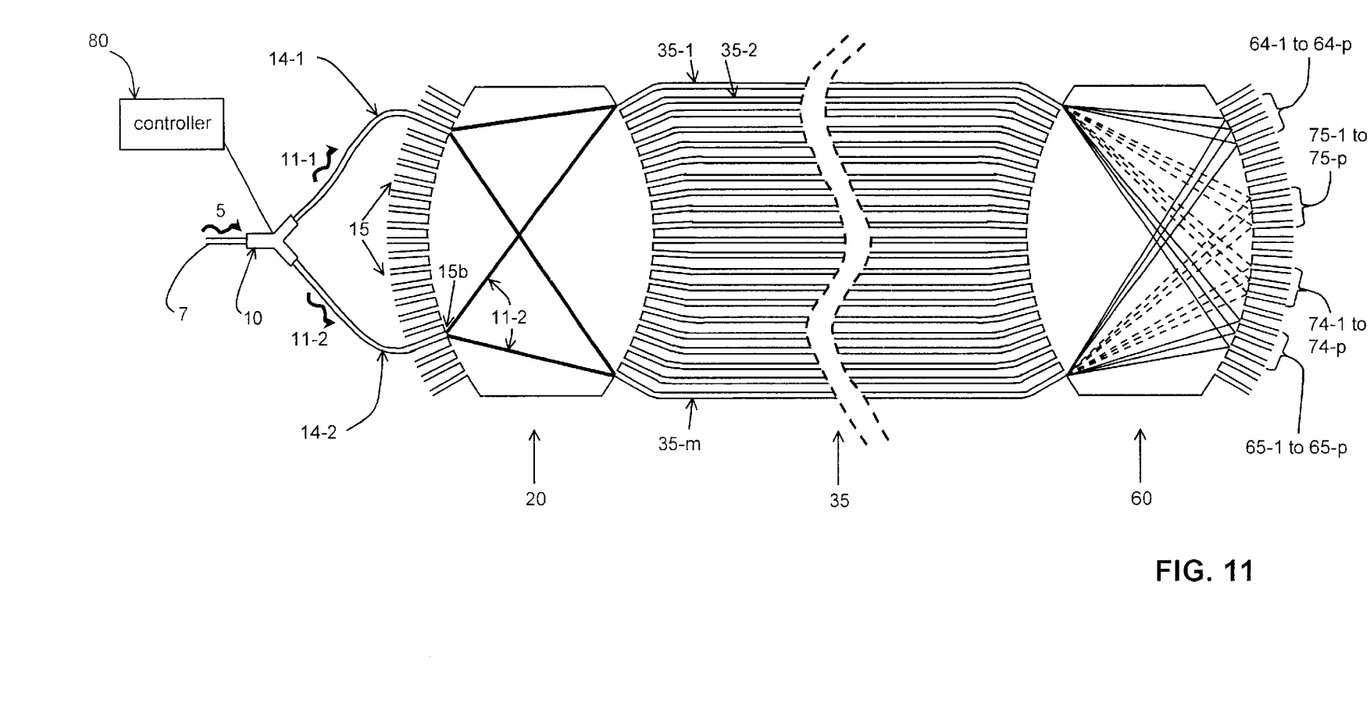
FIG. 11 is a schematic diagram of an embodiment of the invention in which demultiplexed adjacent diffraction order signals do not overlap with demultiplexed main diffraction order signals.
Figure 12:
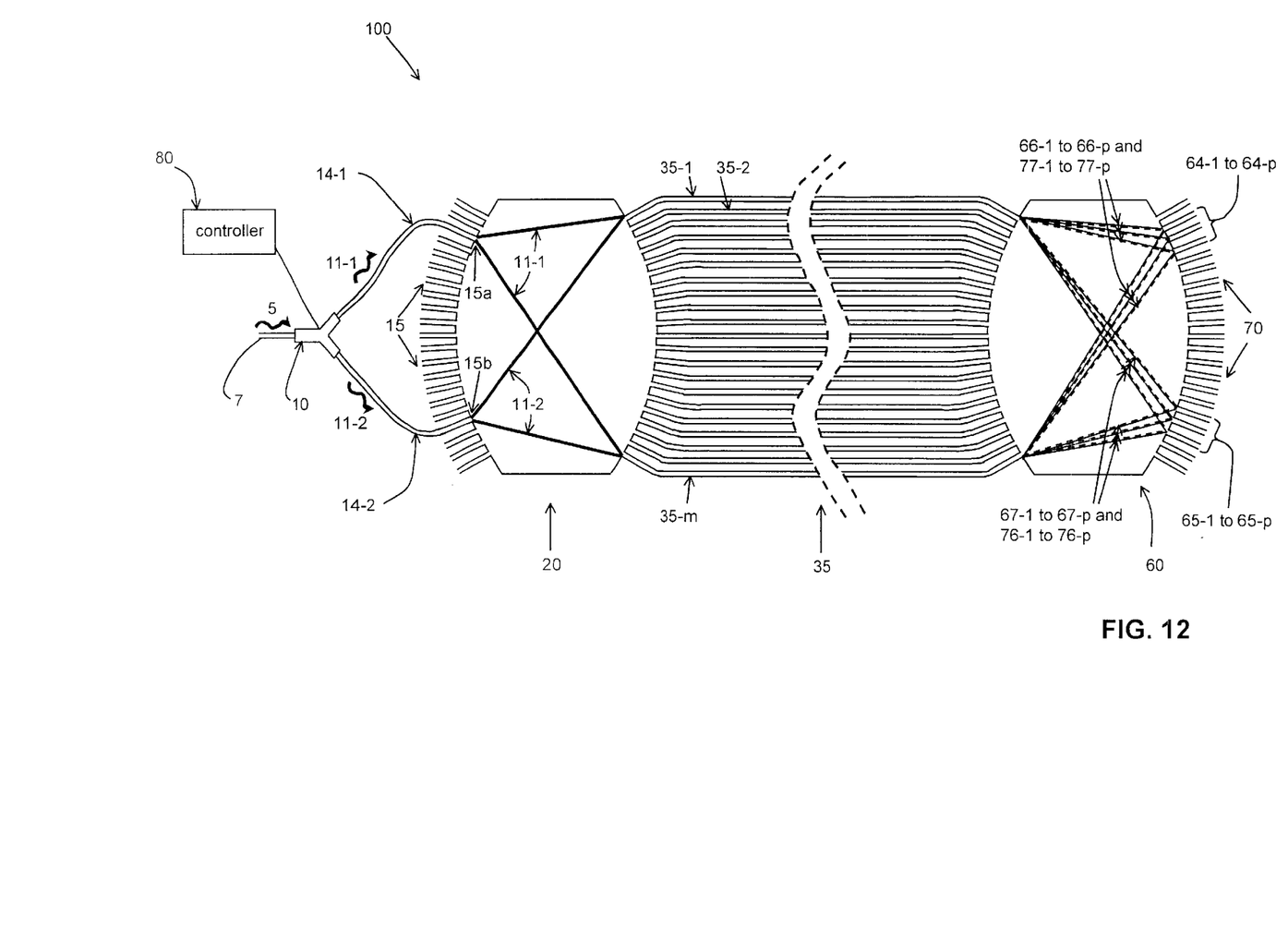
FIG. 12 is a schematic diagram of an embodiment of the invention in which demultiplexed adjacent diffraction order signals overlap with the corresponding wavelengths of the demultiplexed main diffraction order signal.

In the devices of the present invention, the ports of the first optical slab that are coupled to the n-way optical coupler are spaced so that demultiplexed signals of different wavelengths corresponding to different branch signals do not substantially overlap with one another at the exterior face of the second optical slab. For example, as shown in FIG. 11, the demultiplexed adjacent diffraction order signals are coupled to different ports than those illuminated by the demultiplexed main diffraction order signals. Demultiplexed main diffraction order signals arising from branch signal 11-1 are coupled to ports 64-1 to 64-p of the second optical slab, while the corresponding demultiplexed adjacent diffraction order signals are coupled to ports 74-1 to 74-p of the second optical slab. Demultiplexed main diffraction order signals arising from branch signal 11-2 are coupled to ports 65-1 to 65-p of the second optical slab, while the corresponding demultiplexed adjacent diffraction order signals are coupled to ports 75-1 to 75-p of the second optical slab. Alternatively, as shown in FIG. 12, the demultiplexed adjacent diffraction order signals of branch signal 11-1 may overlap with the corresponding demultiplexed main diffraction order signals of branch signal 11-2, and vice versa. Here, the demultiplexed main diffraction order signals 66-1 to 66-p arising from branch signal 11-1 and the demultiplexed adjacent diffraction order signals 77-1 to 77-p arising from branch signal 11-2 are coupled to ports 64-1 to 64-p of the second optical slab. Likewise, the demultiplexed main diffraction order signals 67-1 to 67-p arising from branch signal 11-2 and the demultiplexed adjacent diffraction order signals 76-1 to 76-p arising from branch signal 11-1 are coupled to ports 65-1 to 65-p of the second optical slab. It is noted that each port receives signals of a substantially single wavelength. For example, port 64-1 receives signal 67-1 and signal 76-1, each having wavelength $\lambda_1$. The splitting ratio of the n-way optical coupler 10 as well as the intensity and position of any adjacent diffraction order diffraction will determine the ratio of the intensities of the sets of demultiplexed signals received by the ports of the second optical slab. AWG design techniques familiar to the skilled artisan may be used to select the appropriate spacing of the n ports of the first optical slab and the ports of the second optical slab to prevent the overlap of demultiplexed main diffraction order signals corresponding to different outputs of the n-way coupler as well as the overlap of different wavelengths corresponding to different outputs of the n-way coupler.

In a preferred aspect of this invention, 2-way optical coupler 10 splits primary optical signal 5 into two signals having at least about a 90:10 intensity ratio, such that a first branch signal is at least about nine times as intense as a second branch signal. Thus, when the demultiplexed signals reach the exterior face of the second optical slab, the intensity (over all wavelengths) of the first set of demultiplexed signals will be much larger than the intensity (over all wavelengths) of the second set of demultiplexed signals. In this embodiment, the first set of demultiplexed signals may be passed on to a conventional optical communication system, while the second set of demultiplexed signals may be coupled to a photodetector array and used to monitor signal integrity. This type of intensity distribution can allow for adequate monitoring of the individual wavelengths of the primary signal without having to tap a portion of each primary signal wavelength individually. Having a large difference in intensities between branch signals is also advantageous in that it minimizes the effects of destructive interference between wavelength-overlapping diffraction orders of different branch signals. Use of a polarization beam splitter as the n-way optical coupler will also minimize the effects of interference between branch signals.

In another preferred embodiment of the present invention, n-way optical coupler 10 may function to switch substantially all of the primary optical signal between the n outputs of the n-way optical coupler. For example, n-way optical coupler may be a 1×2 thermo-optic switch. In such a device, the primary optical signal will be demultiplexed, and the demultiplexed main diffraction order signals will be coupled to one set of ports of the second optical slab. By switching the n-way optical coupler 10, the demultiplexed signals may be switched between sets of ports of the second optical slab 60. As such, this exemplary device can provide both demultiplexing and switching functions. In order to reduce crosstalk, it may be preferable to have demultiplexed adjacent diffraction order signals corresponding to one output of the n-way coupler not overlap with demultiplexed main diffraction order signals arising from another output of the n-way coupler.

Figure 13:
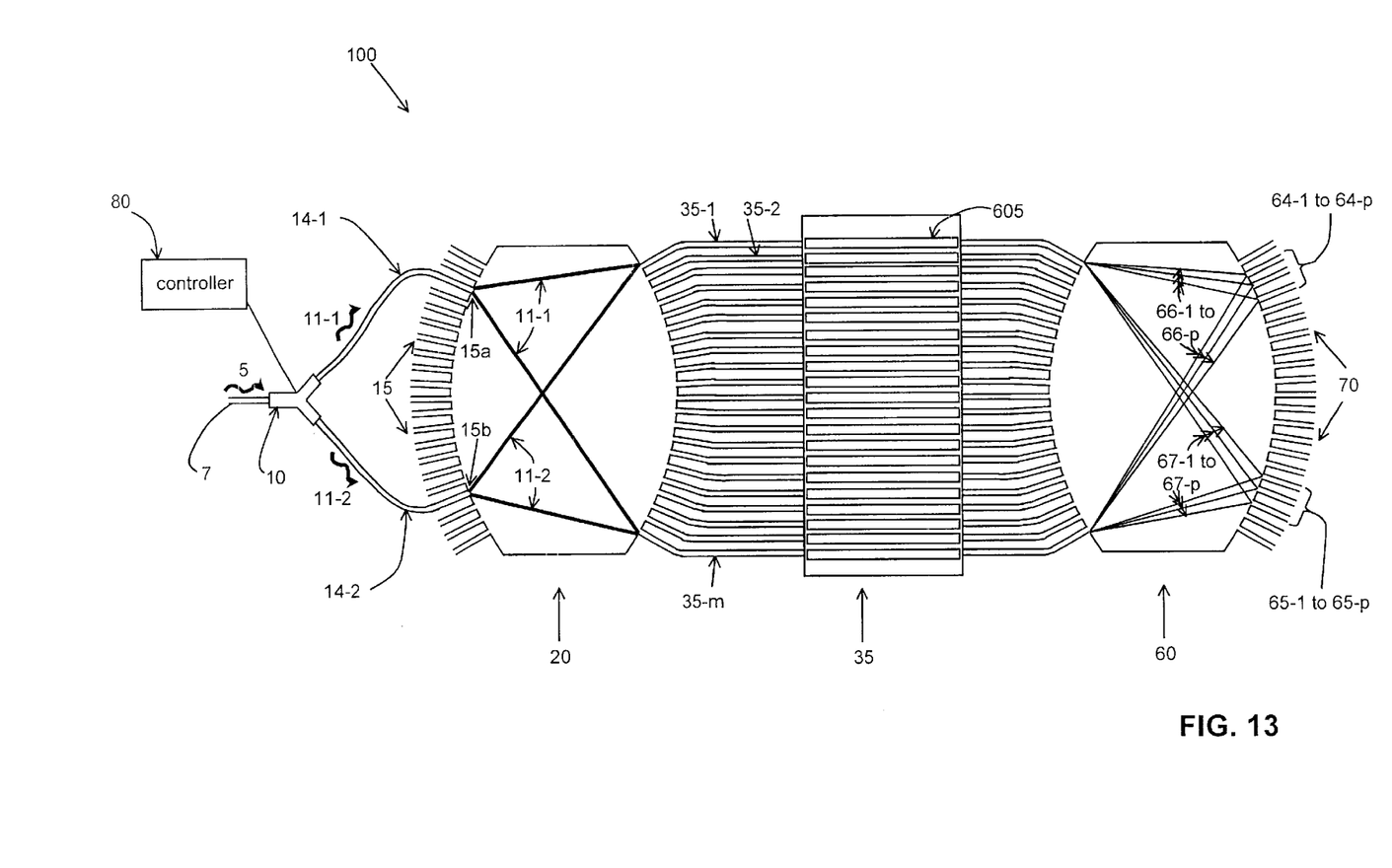
FIG. 13 is a schematic of an alternative configuration of a waveguide array structure that includes a plurality of controllable variable path length elements according to an alternative embodiment of the present invention.

In one embodiment of the present invention, shown in FIG. 13, at least one of the waveguides of the waveguide array includes a path section 605 with a controllable path length. Such devices are described in commonly owned and copending U.S. patent application Ser. No. 09/930,722, filed Aug. 15, 2001 and entitled "Demultiplexer/Multiplexer with a Controlled Variable Path Length Device," incorporated herein by reference. In this device, the channel spacing of the demultiplexer may be changed by controlling the path length of the path sections of one or more of the path length elements.

Figure 14:
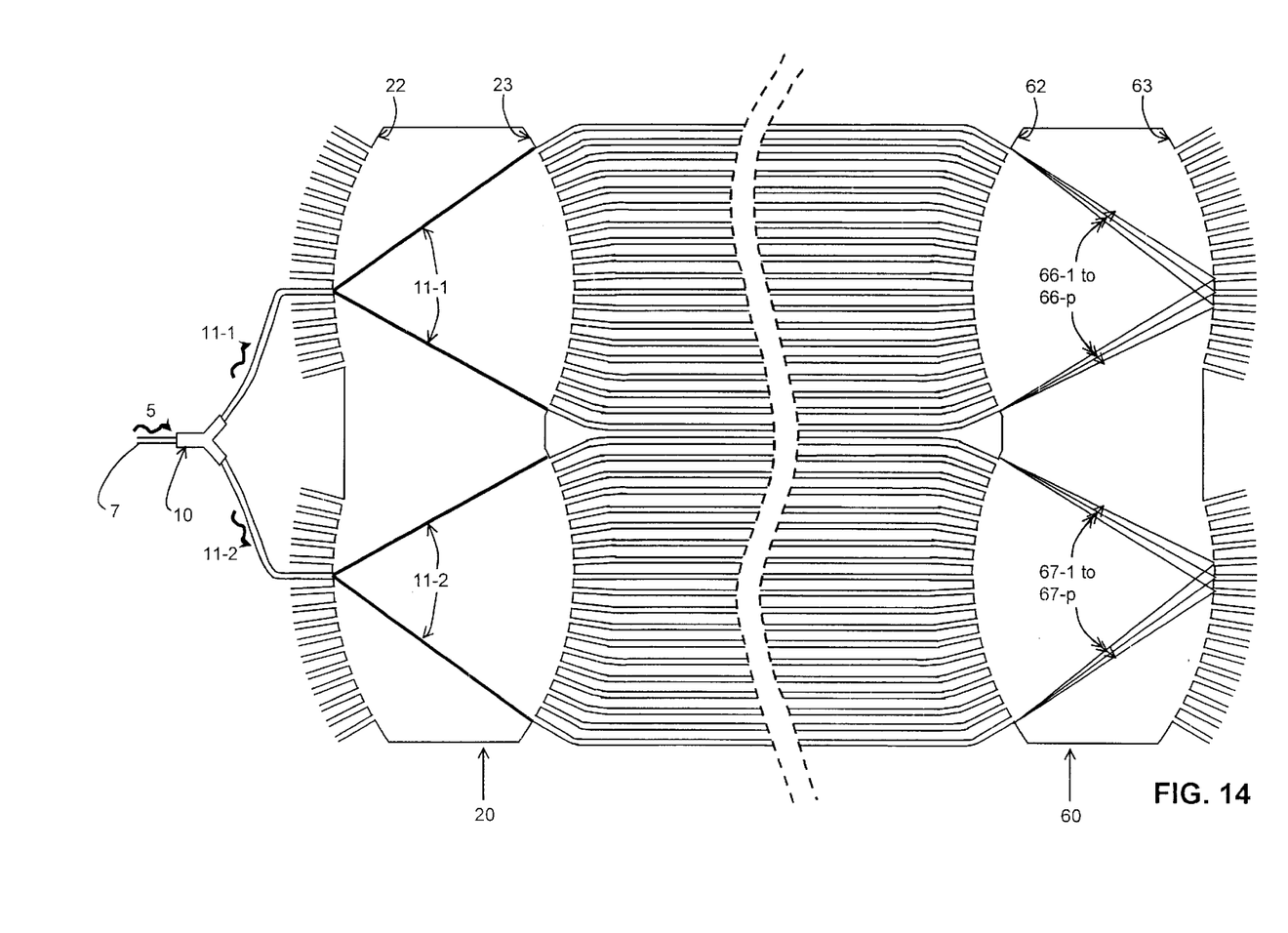
FIG. 14 is a schematic diagram of a device of the present invention in which the input and output faces of the first and second optical slabs are shaped to have multiple focal points.

As described above in connection with FIG. 8, the ports of the first optical slab may be spaced such that signals emanating therefrom illuminate non-overlapping subsets of waveguides of the waveguide array structure. In such a device, the first and second optical slabs may be shaped so that their interior and exterior faces have a plurality of focal points. For example, as shown in FIG. 14, the first and second slabs may be bifocal. Each of the exterior and interior faces of the optical slabs (22, 23, 62 and 63) include two arc sections, each having a different focal point. As the skilled artisan will appreciate, not all of the faces of the optical slabs must be multi-focal. The number of focal points may be varied with the number of ports of the first optical slab.

Figure 15:
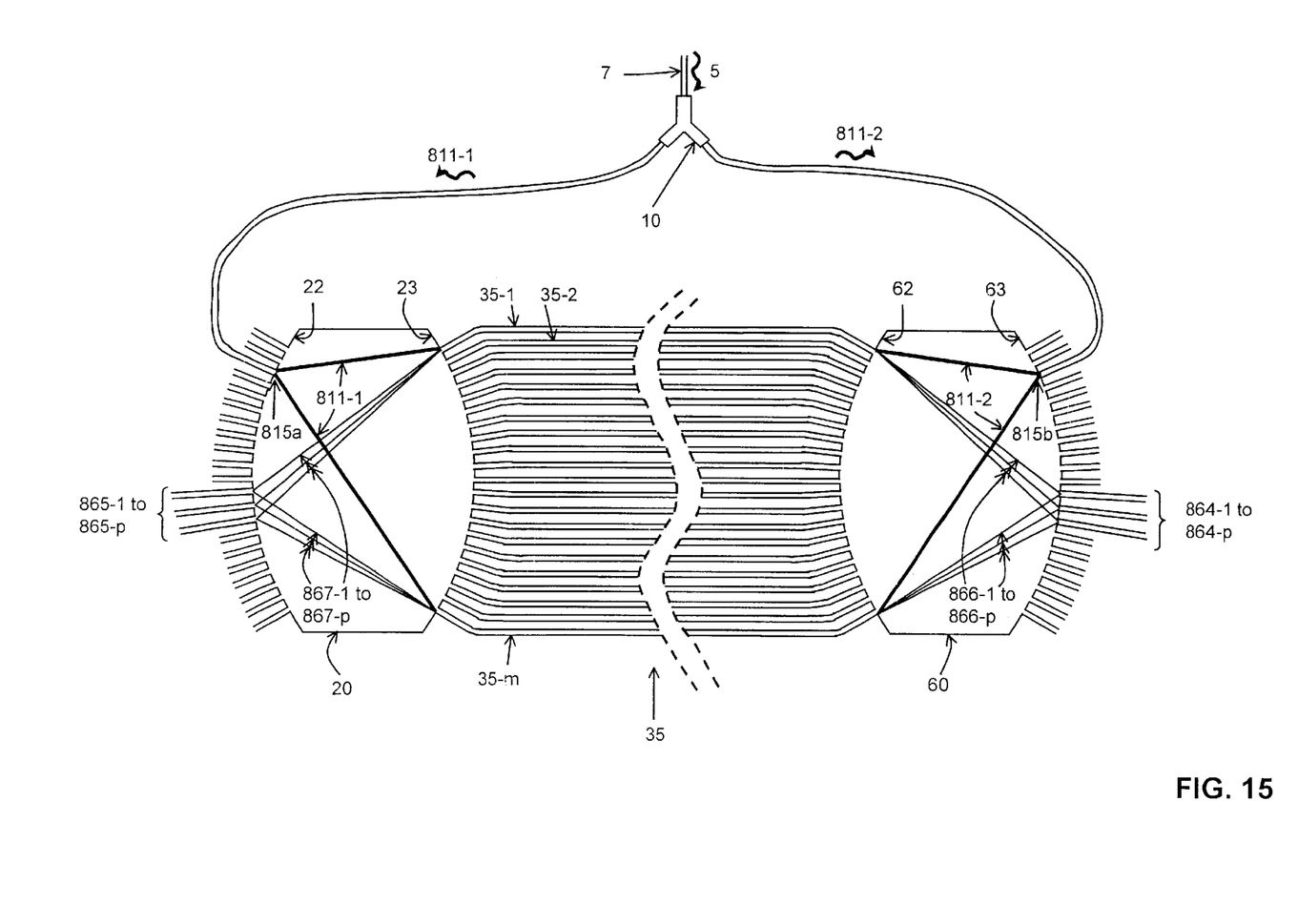
FIG. 15 is a schematic diagram of a device of the present invention in which one output of the n-way optical coupler is coupled to the first optical slab, and another output of the n-way optical coupler is coupled to the second optical slab.

In another embodiment of the present invention, shown in FIG. 15, a device 800 for receiving a primary optical signal includes the arrayed waveguide grating device and the n-way optical coupler described above. In this embodiment, one output of the n-way optical coupler is coupled to a port 815a of the exterior face of the first optical slab, while another output of the n-way optical coupler is coupled to a port 815b of the exterior face of the second optical slab. In the example of FIG. 15, branch signal 811-1 enters the first optical slab 20 via port 815a, is coupled to the waveguides of the waveguide array 35, and is demultiplexed in the second optical slab 60 to give a first set of demultiplexed main diffraction order optical signals 866-1 to 866-p, which are coupled to ports 846-1 to 864-p of the second optical slab. Branch signal 811-2 enters the second optical slab via port 815b, is coupled to the waveguides of the waveguide array 35, and is demultiplexed in the first slab to give a second set of demultiplexed main diffraction order optical signals 867-1 to 867-p, which are coupled to ports 865-1 top 865-p of the second optical slab. In this device, there is little chance that the main diffraction order demultiplexed signals from the different branch signals will overlap with each other, as they are demultiplexed in different optical slabs. It is preferable that demultiplexed main diffraction order signals or any demultiplexed adjacent diffraction order signals are not coupled into the ports 815a and 815b coupled to the n-way optical coupler.

The device of FIG. 15 may be designed to provide signal redundancy in an optical communication system by using a 2-way optical coupler with an approximately 50:50 splitting ratio. Alternatively, the device of FIG. 15 may be used to provide both demultiplexing and monitoring functionality by using a 2-way optical coupler with a splitting ratio of about 90:10 or greater. The set of ports corresponding to the stronger branch signal can be coupled to an external communication system, while the set of ports corresponding to the can be coupled to a set of photodetectors for use as a channel power monitor. As the skilled artisan will appreciate, the n-way coupler may also be operative to switch the demultiplexed main diffraction order signals between sets of ports.

The devices of the present invention have been described in connection with demultiplexing applications. As the skilled artisan will recognize, the devices of the present invention may also be used in multiplexing applications by reversing the flow of the optical signals through the device. Likewise, the devices of the present invention may be designed by the skilled artisan to simultaneously demultiplex an incoming optical signal and multiplex an outgoing optical signal.

The use of the present invention, which can combine demultiplexing with other functions such as switching, splitting and tap monitoring, can result in better utilization of physical system space and optical power. Alternative applications will be apparent to those of skill in the art given the present description. For example, the n-way optical coupler may split the primary signal into three substantially equal branch signals, which are then demultiplexed. Each single wavelength signal may be sent to a different node in an optical communication system.

While the above provides a full and complete disclosure of the preferred embodiments of the present invention, various modifications, alternate constructions, and equivalents may be employed without departing from the scope of the invention. Therefore, the above description and illustration should not be construed as limiting the scope of the invention, which is defined by the appended claims.

What is claimed is:

1. An optical device for receiving a primary optical signal having one or more wavelengths, the optical device comprising:
   an n-way optical coupler, where n is an integer $\geq 2$, the n-way optical coupler having one input and n outputs, the n-way optical coupler directing the optical signal into at least one of the outputs of the n-way optical coupler; and
   an arrayed waveguide grating including
      a first optical slab having an exterior face and an interior face, the exterior face having n ports, each of the n ports being coupled to an output of the n-way optical coupler, each port receiving the optical signal emerging from the corresponding output of the n-way optical coupler;
      a waveguide array structure including a plurality of waveguides, each of the waveguides having a first end coupled to the interior face of the first optical slab, each of the waveguides having an second end; and
      a second optical slab having an interior face and an exterior face, the interior face being coupled to the second end of each of the plurality of waveguides of the waveguide array structure, the exterior face having a plurality of ports, wherein the optical signal emerging from each of the outputs of the n-way coupler is demultiplexed to a corresponding set of demultiplexed main diffraction order signals in the second optical slab, wherein the n ports of the first optical slab that are coupled to the n-way optical coupler are spaced in relation to one another such that for each of the outputs of the n-way coupler, the demultiplexed main diffraction order signals corresponding to an optical signal emerging from that output of the n-way coupler do not substantially overlap with the demultiplexed main diffraction order signals corresponding to an optical signal emerging from any other of the outputs of the n-way optical coupler at the exterior face of the second optical slab, and wherein the n ports of the first optical slab that are coupled to the n-way optical coupler are spaced in relation to one another such that demultiplexed signals of one wavelength do not substantially overlap with demultiplexed signals of another wavelength at the exterior face of the second optical slab.

2. The optical device according to claim 1, wherein the n-way optical coupler splits the primary optical signal into at least two branch signals, each branch signal being coupled to a different output of the n-way optical coupler.

3. The optical device according to claim 2 wherein the ratio of the intensities of the branch signals is variable.

4. The optical device according to claim 3, further comprising a controller operatively coupled to the n-way optical coupler to vary the ratio of intensities of the branch signals.

5. The optical device according to claim 2, wherein the ratio of the intensities of a first branch signal to the intensity of a second branch signal is at least about 90:10.

6. The optical device according to claim 1, wherein the n-way optical coupler is operative to switch substantially all of the primary optical signal between the n outputs of the n-way optical coupler.

7. The optical device according to claim 6, further comprising a controller operatively coupled to the n-way optical coupler to switch the optical signal between the n outputs of the n-way optical coupler.

8. The optical device according to claim 1, wherein the exterior face of the first optical slab further includes at least one additional port, the port being between two of the n ports that are coupled to the n-way optical coupler.

9. The optical device according to claim 1, wherein the n-way optical coupler is selected from the group consisting of a Y waveguide optical coupler, a Mach Zehnder interferometer, a directional coupler, a device having a semi-transparent mirror and a polarization beam splitter.

10. The optical device according to claim 1 wherein the n-way optical coupler comprises a plurality of cascaded 1×2 couplers.

11. The optical device of claim 1 wherein at least one of the faces of at least one of the optical slabs is shaped to have more than one focal point.

12. An optical device for receiving a primary optical signal having one or more wavelengths, the optical device comprising:
   an arrayed waveguide grating including
      a first optical slab having an exterior face and an interior face, the exterior face having a plurality of ports,
      a waveguide array structure including a plurality of waveguides, each of the waveguides having a first end coupled to the interior face of the first optical slab, each of the waveguides having an second end; and
      a second optical slab having an interior face and an exterior face, the interior face being coupled to the second end of each of the plurality of waveguides of the waveguide array structure, the exterior face having a plurality of ports; and an n-way optical coupler, where n is an integer $\geq 2$, the n-way optical coupler having one input and n outputs, the n-way optical coupler directing the optical signal into at least one of the outputs of the optical coupler, one of the outputs of the n-way optical coupler being coupled to a port of the first optical slab, another of the outputs of the n-way optical coupler being coupled to a port of the second optical slab, whereby an optical signal coupled into a port of the first optical slab is demultiplexed to a set of demultiplexed main diffraction order signals in the second optical slab, and an optical signal coupled into a port of the second optical slab is demultiplexed to a set of demultiplexed main diffraction order signals in the first optical slab.

13. The optical device according to claim 12 wherein the ratio of the intensities of the branch signals is variable.

14. The optical device according to claim 13, further comprising a controller operatively coupled to the n-way optical coupler to vary the ratio of intensities of the branch signals.

15. The optical device of claim 12 wherein the n-way optical coupler splits the primary optical signal into two branch signals having a at least a 90:10 intensity ratio, and wherein a first set of demultiplexed main diffraction order signals corresponding to the stronger branch signal are coupled into a set of ports of the second optical slab, and a second set of demultiplexed main diffraction order signals corresponding to a weaker branch signal are coupled into a set of ports of the first optical slab.

16. The optical device of claim 15 wherein the set of ports of the first optical slab is coupled to an array of photodetectors.

17. The optical device according to claim 12, wherein the n-way optical coupler is selected from the group consisting of a Y waveguide optical coupler, a Mach Zehnder interferometer, a directional coupler, a device having a semi-transparent mirror and a polarization beam splitter.

18. The optical device of claim 12 wherein the n-way optical coupler splits the primary optical signal into two branch signals of about equal intensity, and wherein a first set of demultiplexed main diffraction order signals are coupled into a set of ports of the second optical slab, and a second set of demultiplexed main diffraction order signals are coupled into a set of ports of the first optical slab.

19. The optical device according to claim 12, wherein the n-way optical coupler splits the primary optical signal into at least two branch signals, each branch signal being coupled to a different output of the n-way optical coupler.

20. The optical device according to claim 12, wherein the n-way optical coupler is operative to switch substantially all of the primary optical signal between the n outputs of the n-way optical coupler.

* * * * *